United States Patent
Flynn (10) Patent No.: US 6,843,065 B2
(45) Date of Patent: *Jan. 18, 2005

(54) VERY LOW TEMPERATURE REFRIGERATION SYSTEM WITH CONTROLLED COOL DOWN AND WARM UP RATES AND LONG TERM HEATING CAPABILITIES

(75) Inventor: Kevin P. Flynn, Novato, CA (US)

(73) Assignee: ICC-Polycold System Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,001

(22) Filed: Apr. 28, 2003

(65) Prior Publication Data

US 2004/0020221 A1 Feb. 5, 2004

Related U.S. Application Data

(63) Continuation-in-part of application No. 09/870,385, filed on May 30, 2001, now Pat. No. 6,574,978.
(60) Provisional application No. 60/207,921, filed on May 30, 2000, provisional application No. 60/214,560, filed on Jun. 27, 2000, and provisional application No. 60/214,562, filed on Jun. 28, 2000.

(51) Int. Cl.[7] .......................... F25D 21/06; F25B 41/00; F25B 49/00; F25B 47/00
(52) U.S. Cl. ........................... 62/156; 62/278; 62/196.4
(58) Field of Search ...................... 62/156, 278, 196.1, 62/196.4, 277, 217, 114, 151, 197, 198, 199

(56) References Cited

U.S. PATENT DOCUMENTS

| | | | | |
|---|---|---|---|---|
| 4,535,597 A | * | 8/1985 | Missimer et al. | 62/55.5 |
| 4,597,267 A | * | 7/1986 | Forrest | 62/278 |
| 6,574,978 B2 | * | 6/2003 | Flynn et al. | 62/278 |
| 6,644,067 B2 | * | 11/2003 | Stenhouse | 62/513 |

* cited by examiner

Primary Examiner—Chen Wen Jiang
(74) Attorney, Agent, or Firm—Katten Muchin Zavis Rosenman (57) ABSTRACT

Heating/defrost constructions of a very low temperature refrigeration system having a defrost supply circuit and a defrost return bypass circuit optimizing the heating/defrost cycle, preventing overload (excessive pressure) of its refrigeration process and protecting components from damaging temperatures. The defrost cycle operates continuously, when required, and provides a shorter recovery period between heating/defrost and cooling operating modes. The rate of the temperature change during cool down or warm up is controlled in an open loop fashion by controlled refrigerant flow in bypass circuits.

3 Claims, 8 Drawing Sheets

VERY LOW TEMPERATURE REFRIGERATION SYSTEM WITH CONTROLLED COOL DOWN AND WARM UP RATES AND LONG TERM HEATING CAPABILITIES

This is a Continuation in Part of U.S. application Ser. No. 09/870,385 filed May 30, 2001 now U.S. Pat. No. 6,574,978, which claims the benefit of provisional application No. 60/207,921 filed May 30, 2000.

RELATED APPLICATIONS (INCORPORATED HEREIN BY REFERENCE)

U.S. provisional application No. 60/214,560 filed Jun. 27, 2000.

U.S. provisional application No. 60/214,562 filed Jun. 28, 2000.

FIELD OF THE INVENTION

This invention is directed to heating/defrost cycles of a very low temperature refrigeration system, and more particularly, to an improved heating cycle incorporating a defrost supply loop and a defrost return bypass loop for optimizing the heating/defrost cycle, for preventing overload (excessive pressure) of its refrigeration process and thereby allowing the defrost cycle to operate continuously, for shorter recovery period between heating/defrost and cooling operating modes, for controlled flow where the rate of the temperature change during cool down or warm up is controlled in an open loop fashion.

BACKGROUND OF THE INVENTION

Refrigeration systems have been in existence since the early 1900s, when reliable sealed refrigeration systems were developed. Since that time, improvements in refrigeration technology have proven their utility in both residential and industrial settings. In particular, low-temperature refrigeration systems currently provide essential industrial functions in biomedical applications, cryoelectronics, coating operations, and semiconductor manufacturing applications. In many of these applications, it is necessary that refrigeration systems not only need to provide low temperatures but also undergo a defrost cycle in which the system is brought to a temperature well above 0° C. The company that develops the refrigeration systems that can perform across this range of temperatures and own the related intellectual property stands to reap substantial gains.

Providing refrigeration at temperatures below −50 C has many important applications, especially in industrial manufacturing and test applications. This invention relates to refrigeration systems which provide refrigeration at temperatures between −50 C and −250 C. The temperatures encompassed in this range are variously referred to as low, ultra low and cryogenic. For purposes of this Patent the term "very low" or very low temperature will be used to mean the temperature range of −50 C to −250 C.

In many manufacturing processes conducted under vacuum conditions, and for a variety of reasons, the heating of a system element is required. This heating process is known as a defrost cycle. The heating elevates the temperature of the manufacturing system, enabling parts of the system to be accessed and vented to atmosphere without causing condensation of moisture in the air. The longer the overall defrost cycle and subsequent resumption of producing very low temperatures, the lower the throughput of the manufacturing system. Enabling a quick defrost and a quick resumption of the cooling of the cryosurface in the vacuum chamber is beneficial. What is needed is a way to increase the throughput of a vacuum process.

There are many vaccuum processes which have the need for such very low temperature cooling. The chief use is to provide water vapor cryopumping for vacuum systems. The very low temperature surface captures and holds water vapor molecules at a much higher rate than they are released. The net effect is to quickly and significantly lower the chamber's water vapor partial pressure. Another application involves thermal radiation shielding. In this application large panels are cooled to very low temperatures. These cooled panels intercept radiant heat from vacuum chamber surfaces and heaters. This can reduce the heat load on surfaces being cooled to lower temperatures than the panels. Yet another application is the removal of heat from objects being manufactured. In some cases the object is an aluminum disc for a computer hard drive, a silicon wafer for an integrated circuit, or the material for a flat panel display. In these cases the very low temperature provides a means for removing heat from these objects more rapidly than other means, even though the object's final temperature at the end of the process step may be higher than room temperature. Further, some applications involving, hard disc drive media, silicon wafers, or flat panel display material, involve the deposition of material onto these objects. In such cases heat is released from the object as a result of the deposition and this heat must be removed while maintaining the object within prescribed temperatures. Cooling a surface like a platen is the typical means of removing heat from such objects. In all these cases it is to be understood that the evaporator surface is where the refrigerant is removing heat from these customer applications when providing cooling at very low temperatures.

In many refrigeration applications, a high temperature for a longer period is needed to allow for a slow response time of the item being heated. With extended defrost times, conventional systems get overloaded and shut down due to high discharge pressures ranging from 300 to 500 psi. The system's compressor's discharge pressure needs to be limited to protect against excessive discharge pressures; otherwise, downstream components are over-pressurized. Typically, a safety switch or pressure relief valve is in place to prevent excessive discharge pressure; however, this inhibits the defrost cycle. What is needed is a way to increase the defrost time of a refrigeration system without exceeding its operating limits.

In many applications, gradual heating or cooling may be required. For example, rapid temperature changes in a ceramic chuck of a semiconductor wafer manufacturing process cannot exceed certain limits that vary based on the specific material properties of the chuck. If this rate is exceeded, the chuck will crack. What is needed is a way to provide a variable heating and cooling system.

Conventional very low temperature refrigeration systems have a normal defrost time ranging typically from 2 to 4 minutes, and as much as 7 minutes for a large coil. With these defrost times, the refrigeration system is strained due to the high discharge pressures, therefore requiring a 5-minute recovery period before cooling can be resumed, and extending the overall defrost cycle. What is needed is a way to shorten the overall defrost cycle of a refrigeration system.

A bakeout process is the heating of all surfaces in a vacuum chamber to remove water vapor in the chamber after it has been exposed to the atmosphere (such as when the chamber is opened for maintenance). Conventional techniques of performing a bakeout process involve heating the surfaces with a heater that exposes the vacuum chamber components to above 200° C. for a prolonged period of time to expedite outgassing of water vapor from the chamber surfaces. If a cooling surface is in a chamber being heated with this method the remaining refrigerants and oils consequently break down, thus decreasing the reliability of the refrigeration process. What is needed is a way to maintain the chemical stability of the process fluids during a bakeout process.

U.S. Pat. No. 6,112,534, "Refrigeration and heating cycle system and method," assigned to Carrier Corporation (Syracuse, N.Y.), describes an Improved Refrigeration System and Heating/Defrost Cycle. The system, for heating circulating air and defrosting an enclosed area, includes a refrigerant, an evaporator using said refrigerant for heating the circulating air; and a compressor for receiving the refrigerant from the evaporator and compressing the refrigerant to a higher temperature and pressure. The system further includes the combination of an expansion valve positioned between the compressor and the evaporator for forming a partially expanded refrigerant, a controller for sensing system parameters, and a mechanism responsive to said controller, based on the sensed parameters, for increasing temperature differential between the refrigerant and the circulating air, for improving system efficiency and for optimizing system capacity during heating and defrost cycles.

U.S. Pat. No. 6,089,033, "High-speed evaporator defrost system," assigned to Dube, Serge (Quebec, Canada), describes a high-speed evaporator defrost system comprised of a defrost conduit circuit connected to the discharge line of one or more compressors and back to the suction header through an auxiliary reservoir capable of storing the entire refrigerant load of the refrigeration system. Auxiliary reservoir is at low pressure and is automatically flushed into the main reservoir when liquid refrigerant accumulates to a predetermined level. The auxiliary reservoir of the defrost circuit creates a pressure differential across the refrigeration coil of the evaporators sufficient to accelerate the hot high pressure refrigerant gas in the discharge line through the refrigeration coil of the evaporator to quickly defrost the refrigeration coil even at low compressor head pressures and wherein the pressure differential across the coil is in the range of from about 30 psi to 200 psi U.S. Pat. No. 6,076,372, "Variable load refrigeration system particularly for cryogenic temperatures," assigned to Praxair Technology, Inc. (Danbury, Conn.), describes a method for generating refrigeration, especially over a wide temperature range including cryogenic temperatures, wherein a non-toxic, non-flammable and low or non-ozone-depleting mixture is formed from defined components and maintained in variable load form through compression, cooling, expansion, and warming steps in a refrigeration cycle.

U.S. Pat. No. 5,749,243, "Low-temperature refrigeration system with precise temperature control," assigned to Redstone Engineering (Carbondale, Colo.), describes a low-temperature refrigeration system (10) for accurately maintaining an instrument (11) with a time varying heat output at a substantially constant predetermined cryogenic temperature. The refrigeration system (10) controls the temperature of the instrument (11) by accurately adjusting the pressure of coolant at a heat exchanger interface (12) associated with the instrument (11). The pressure and flow of coolant is adjusted through the use of one or two circulation loops and/or a non-mechanical flow regulator (24) including a heater (32). The refrigeration system further provides a thermal capacitor (16) that allows for variation of the cooling output of the system (10) relative to a cooling output provided by a cooling source (14).

U.S. Pat. No. 5,396,777, "Defrost controller," assigned to General Cryogenics Incorporated (Dallas, Tex.), describes a method and apparatus to refrigerate air in a compartment wherein liquid $CO_2$ is delivered through a first primary heat exchanger such that sufficient heat is absorbed to evaporate the liquid carbon dioxide to form pressurized vapor. The pressurized vapor is heated in a gas-fired heater to prevent solidification of the pressurized carbon dioxide when it is depressurized to provide isentropic expansion of the vapor through pneumatically driven fan motors into a secondary heat exchanger. Orifices in inlets to the fan motors and solenoid valves in flow lines to the fan motors keep the vapor pressurized while the heater supplies sufficient heat to prevent solidification when the $CO_2$ vapor expands through the motors. $CO_2$ vapor is routed from the second heat exchanger to chill surfaces in a dehumidifier to condense moisture from a stream of air before it flows to the heat exchangers.

SUMMARY OF THE INVENTION

In summary a first feature of the present invention is a controlled, very low temperature refrigeration system with the capability for long term cooling as low as −250 C and long term heating as high as +130 C.

A second feature of the present invention is a very low temperature refrigeration system having an extended defrost mode that does not allow all the defrost gas to return to its refrigeration process. Instead, the very low temperature refrigeration system of the present invention allows a return bypass, preventing overload of its refrigeration process, and thereby allowing the defrost cycle to operate continuously. In cool mode, however, the defrost return bypass is never allowed once very low temperatures have been reached at the refrigerant return from the evaporator.

A third feature of the present invention is a very low temperature refrigeration system having controlled flow, where the rate of the temperature change during cool down or warm up is controlled in an open loop (i.e. without controller feedback) fashion.

A fourth feature of the present invention is a very low temperature refrigeration system that takes advantage of the full temperature spectrum available in the system to provide constant or variable refrigerant supply and/or return temperatures in a controlled fashion.

A fifth feature of the present invention is a very low temperature refrigeration system that permits a shorter recovery period after a defrost cycle, thereby allowing the reduction of total processing time and an ability to cool down the evaporator faster after completion of defrost or bakeout.

An advantage of the present invention is that it heats the coils of the refrigeration system internally. Conventional systems use an exterior heat source to heat the coils of the refrigeration system.

Another advantage is that the present invention is capable of evaporator temperatures ranging from −150 C to +130° C. Conventional systems have a much smaller temperature range. Further, the present invention and the background patents is that the present invention is capable of operating continuously in defrost mode.

It can increase the throughput of a vacuum system that requires the very low temperatures produced by the refrigeration system of the present invention to initiate the manufacturing process. It can increase the defrost operating time of a refrigeration system without exceeding system operating limits. It provides a variable heating and cooling system. The overall defrost cycle of the refrigeration system is shortened.

Chemical stability of the process fluids is maintained during a bakeout process.

It provides a controlled temperature rate of change in either cool down or warm up mode.

Standard components are used with intrinsic high reliability in their design temperature ranges.

Standard components are used in a unique combination to permit cool and defrost cycles in a mixed refrigerant system.

Nominal system parameters are maintained, such as chemical stability, operating limits of the compressor, and rated working pressure and temperature of all components.

The present invention provides customer adjustability of various control parameters, such as the chopper timer on/off cycle, the temperature at which different events take place, the bakeout time, the cool time, etc.

The present invention eliminates the need for very large and expensive cryogenic valves in the refrigerant return path.

A shorter recovery period after a defrost cycle is provided, thereby allowing the reduction of total processing time.

The present invention is a controlled very low temperature refrigeration system with the capability for long term cooling as low as −150 C and long term heating as high as +130 C using a single evaporator. During an extended defrost mode, the very low temperature refrigeration system does not allow the defrost gas to return to its refrigeration process unit continuously. Instead, the very low temperature refrigeration system of the present invention allows a return bypass, preventing overload (excessive pressure) of its refrigeration process, and thereby allowing the defrost cycle to operate continuously. In a cooling mode, however, the defrost return bypass may be utilized while the cooling surface is being cooled down, thereby enabling a shorter recovery period. Because the very low temperature refrigeration system of the present invention permits a shorter recovery period after each defrost cycle, the total processing time can be reduced. Additionally, there is controlled flow in the very low temperature refrigeration system of the present invention where the rate of the temperature change during cool down or warm up is controlled in an open loop (i.e. without controller feedback) fashion. Furthermore, the very low temperature refrigeration system of the present invention takes advantage of the full temperature spectrum available in the system to provide constant or variable refrigerant supply and/or return temperatures in a controlled fashion.

For a better understanding of the benefits of the controlled very low temperature refrigeration system of the present invention, a brief discussion of a conventional very low temperature refrigeration system is provided below.

Typically, conventional very low temperature refrigeration systems have a defrost function that warms an evaporator surface, such as a coil or stainless steel platen, to room temperature within a few minutes. A short defrost cycle, typically 2 to 4 minutes, adds value to the product because the shorter time required to go from cool to warm allows good use of equipment for the user, i.e., allows higher product throughput.

In a typical defrost cycle, the refrigerant in the evaporator is warmed only to room temperature, which works well with coils but not with other types of surfaces (i.e., stainless steel platen) where there is not a large thermal interface between the evaporator surface (i.e. platen surface) and the refrigerant. Secondly, a stainless steel platen has a long response time. Even though a defrost cycle occurs and the coolant returns from the platen at room temperature or higher, the platen is still cold because of poor response time. As a result, only a portion of the platen has been warmed, and upon completion of the defrost cycle the platen is still colder than acceptable.

Consequently, a longer defrost cycle is desirable. However, current designs of refrigeration systems are limited and do not allow extended defrost time because the system becomes overloaded and shuts down due to high discharge pressure. Typically, a safety switch or pressure relief valve on the discharge side is in place to prevent excessive discharge pressure and possible system damage. Therefore, a longer defrost cycle (using the traditional method) is not possible within the confines of the operating limits of conventional very low temperature refrigeration systems.

The present invention provides a means to provide extended operation in defrost and to prevent the system from experiencing excessive discharge pressures. To accomplish this, a method of bypassing the flow of warm returning refrigerant gas around the refrigeration process is used. The goal of this approach is to use standard refrigeration components for this bypass branch. However, such standard components are not rated for exposure to very low temperature fluids. Operation of these components at very low temperatures will result in failure of elastomer seals, loss of mechanical properties important to assuring proper pressure ratings of the valves and compressor housing due to embrittlement of some alloys at low temperature. The invention describes how to use these standard components in such a way that they are not exposed to very low temperatures.

On the other extreme, very high temperatures can also damage components. Specifically the refrigerant and compressor oil which are always present to some extent in the evaporator, when the evaporator is connected to the refrigeration system. During the bakeout of the vacuum chamber the evaporator could be exposed to temperatures of 200 C or higher. This exceeds the maximum exposure temperature of the refrigerant and oil. Prolonged exposure to these temperatures will result in chemical breakdown of these molecules. The resulting products contain acids which will cause shortened life of key system components such as the compressor. Providing a means of circulating hot refrigerant at +130 C or less through the evaporator in the defrost mode assures that the refrigerant and the oil in the evaporator stay within temperature limits to prevent any chemical decomposition.

Still other objects and advantages of the invention will be apparent in the specification.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For better understanding of the invention, reference is had to the following description taken in connection with the accompanying drawings, in which.

DESCRIPTION OF PREFERRED EMBODIMENTS

Figure 1:
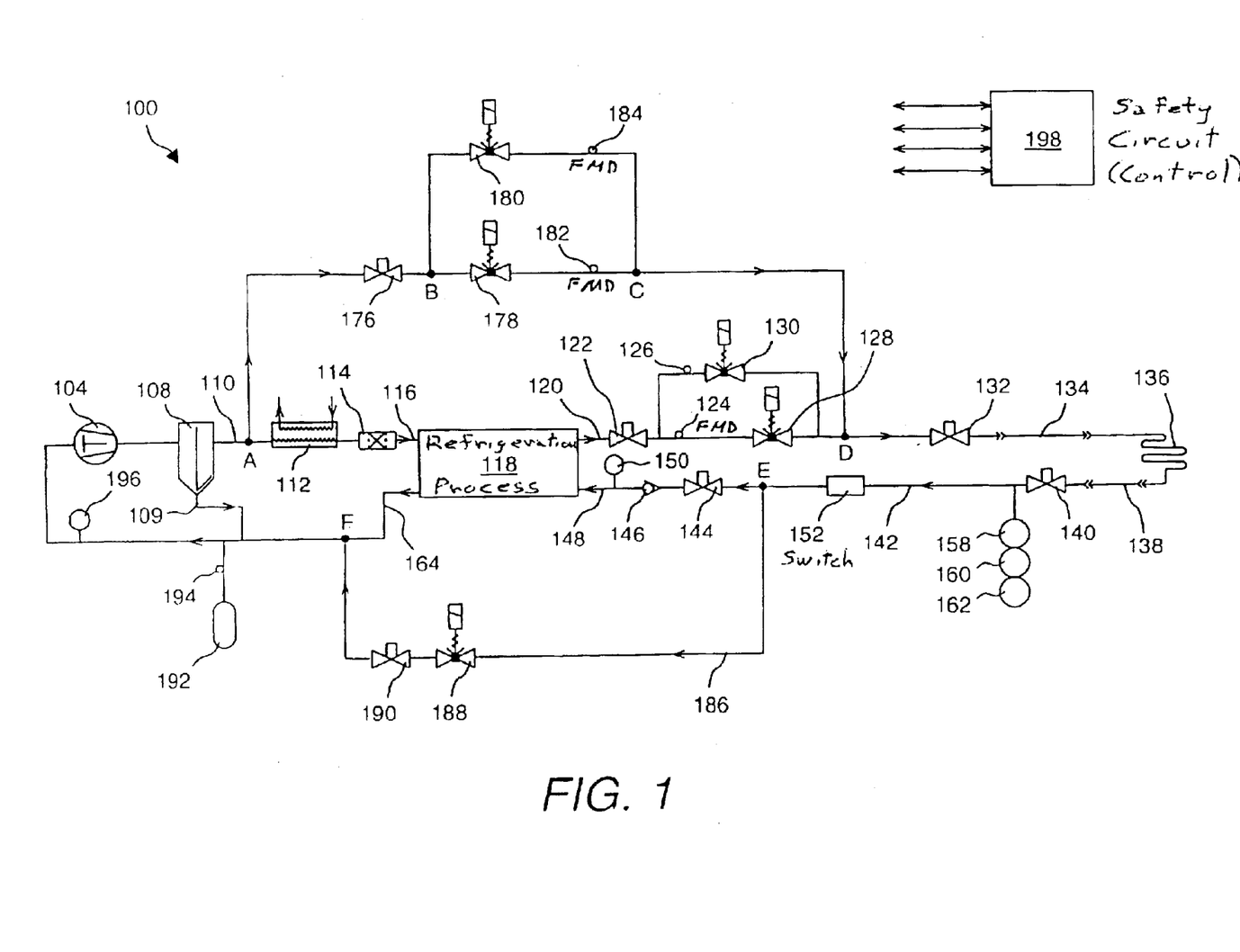
FIG. 1 is a schematic of a very low temperature refrigeration system with bypass circuitry in accordance with the invention.
Figure 2:
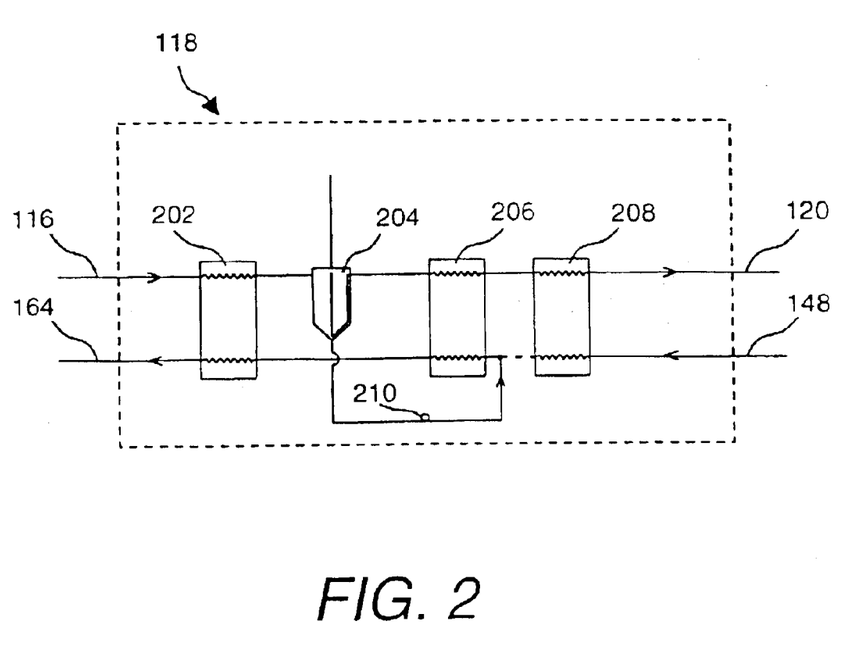
FIG. 2 is a partial schematic diagram of a refrigeration process unit in accordance with the invention for use in the refrigeration system of FIG. 1.

FIG. 1 shows a very low temperature refrigeration system 100 in accordance with the invention. Refrigeration system 100 includes a compressor 104 feeding an inlet of an optional oil separator 108 feeding a condenser 112 via a discharge line 110. Condenser 112 subsequently feeds a filter drier 114 feeding a first supply input of a refrigeration process 118 via a liquid line output 116. Further details of refrigeration process 118 are shown in FIG. 2. An oil separator is not required when oil is not circulated to lubricate the compressor.

Refrigeration process 118 provides a refrigerant supply line output 120 that feeds an inlet of a feed valve 122. The refrigerant exiting feed valve 122 is high pressure refrigerant at very low temperature, typically –50 to –250 C. A flow metering device (FMD) 124 is arranged in series with a cool valve 128. Likewise, an FMD 126 is arranged in series with a cool valve 130. The series combination of FMD 124 and cool valve 128 is arranged in parallel with the series combination of FMD 126 and cool valve 130, where the inlets of FMDs 124 and 126 are connected together at a node that is fed by an outlet of feed valve 122. Furthermore, the outlets of cool valves 128 and 130 are connected together at a node that feeds an inlet of a cryo-isolation valve 132. An outlet of cryo-isolation valve 132 provides an evaporator supply line output 134 that feeds a customer-installed (generally) evaporator coil 136.

The opposing end of evaporator 136 provides an evaporator return line 138 feeding an inlet of a cryo-isolation valve 140. An outlet of cryo-isolation valve 140 feeds an inlet of a very low temperature flow switch 152 via internal return line 142. An outlet of cryogenic flow switch 152 feeds an inlet of a return valve 144. An outlet of return valve 144 feeds an inlet of a check valve 146 that feeds a second input (low pressure) of refrigeration process 118 via a refrigerant return line 148.

A temperature switch (TS) 150 is thermally coupled to refrigerant return line 148 between check valve 146 and refrigeration process 118. Additionally, a plurality of temperature switches, having different trip points, are thermally coupled along internal return line 142. A TS 158, a TS 160, and a TS 162 are thermally coupled to internal return line 142 between cryo-isolation valve 140 and return valve 144.

The refrigeration loop is closed from a return outlet of refrigeration process 118 to an inlet of compressor 104 via a compressor suction line 164. A pressure switch (PS) 196 located in close proximity of the inlet of compressor 104 is pneumatically connected to compressor suction line 164. Additionally, an oil return line 109 of oil separator 108 feeds into compressor suction line 164. Refrigeration system 100 further includes an expansion tank 192 connected to compressor suction line 164. An FMD 194 is arranged inline between the inlet of expansion tank 192 and compressor suction line 164.

A defrost supply loop (high pressure) within refrigeration system 100 is formed as follows: An inlet of a feed valve 176 is connected at a node A located in discharge line 110. A defrost valve 178 is arranged in series with an FMD 182; likewise, a defrost valve 180 is arranged in series with an FMD 184. The series combination of defrost valve 178 and FMD 182 is arranged in parallel with the series combination of defrost valve 180 and FMD 184, where the inlets of defrost valves 178 and 180 are connected together at a node B that is fed by an outlet of feed valve 176. Furthermore, the outlets of FMDs 182 and 184 are connected together at a node C that feeds a line that closes the defrost supply loop by connecting in the line at a node D between cool valve 128 and cryo-isolation valve 132.

A refrigerant return bypass (low pressure) loop within refrigeration system 100 is formed as follows: A bypass line 186 is fed from a node E located in the line between cryogenic flow switch 152 and return valve 144. Connected in series in bypass line 186 are a bypass valve 188 and a service valve 190. The refrigerant return bypass loop is completed by an outlet of service valve 190 connecting to a node F located in compressor suction line 164 between refrigeration process 118 and compressor 104.

With the exception of TS 150, TS 158, TS 160, and TS 162, all elements of refrigeration system 100 are mechanically and hydraulically connected.

A safety circuit 198 provides control to, and receives feedback from, a plurality of control devices disposed within refrigeration system 100, such as pressure and temperature switches. PS 196, TS 150, TS 158, TS 160, and TS 162 are examples of such devices; however, there are many other sensing devices disposed within refrigeration system 100, which are for simplicity not shown in FIG. 1. Pressure switches, including PS 196, are typically pneumatically connected, whereas temperature switches, including TS 150, TS 158, TS 160, and TS 162, are typically thermally coupled to the flow lines within refrigeration system 100. The controls from safety circuit 198 are electrical in nature. Likewise, the feedback from the various sensing devices to safety circuit 198 is electrical in nature.

Refrigeration system 100 is a very low temperature refrigeration system and its basic operation, which is the removal and relocation of heat, is well known in the art. Refrigeration system 100 of the present invention uses pure or mixed refrigerant, such as the mixed refrigerant described in U.S. Prov. Appl. No. 60/214,562.

With the exception of cryo-isolation valves 132 and 140, all elements of refrigeration system 100 are well known in the industry (i.e., compressor 104, oil separator 108, condenser 112, filter drier 114, refrigeration process 118, feed valve 122, FMD 124, cool valve 128, FMD 126, cool valve 130, evaporator coil 136, return valve 144, check valve 146, TS 150, TS 158, TS 160, TS 162, feed valve 176, defrost valve 178, FMD 182, defrost valve 180, FMD 184, bypass valve 188, service valve 190, expansion tank 192, FMD 194, PS 196, and safety circuit 198). Additionally, cryogenic flow switch 152 is fully described in U.S. Prov. Appl. No. 60/214,560. For clarity however, some brief discussion of the elements is included below.

Compressor 104 is a conventional compressor that takes low-pressure low-temperature refrigerant gas and compresses it to high-pressure, high-temperature gas that is fed to oil separator 108.

Oil separator 108 is a conventional oil separator in which the compressed mass flow from compressor 104 enters into a larger separator chamber that lowers the velocity, thereby forming atomized oil droplets that collect on the impingement screen surface or a coalescing element. As the oil droplets agglomerate into larger particles they fall to the bottom of the separator oil reservoir and return to compressor 104 via compressor suction line 164. The mass flow from oil separator 108, minus the oil removed, continues to flow toward node A and onward to condenser 112.

The hot, high-pressure gas from compressor 104 travels through oil separator 108 and then through condenser 112. Condenser 112 is a conventional condenser, and is the part of the system where the heat is rejected by condensation. As the hot gas travels through condenser 112, it is cooled by air or water passing through or over it. As the hot gas refrigerant cools, drops of liquid refrigerant form within its coil. Eventually, when the gas reaches the end of condenser 112, it has condensed partially; that is, liquid and vapor refrigerant are present. In order for condenser 112 to function correctly, the air or water passing through or over the condenser 112 must be cooler than the working fluid of the system. For some special applications the refrigerant mixture will be composed such that no condensation occurs in the condenser.

The refrigerant from condenser 112 flows onward through filter drier 114. Filter drier 114 functions to adsorb system contaminants, such as water, which can create acids, and to provide physical filtration. The refrigerant from filter drier 114 then feeds refrigeration process 118.

Refrigeration process 118 is any refrigeration system or process, such as a single-refrigerant system, a mixed-refrigerant system, normal refrigeration processes, an individual stage of a cascade refrigeration processes, an auto-refrigerating cascade cycle, or a Kilmenko cycle. For the purposes of illustration in this disclosure, refrigeration process 118 is shown in FIG. 2 in accordance with the invention as a simplified version of an auto-refrigerating cascade cycle that is also described by Klimenko.

Several basic variations of refrigeration process 118 shown in FIG. 2 are possible. Refrigeration process 118 may be one stage of a cascaded system, wherein the initial condensation of refrigerant in condenser 112 may be provided by low temperature refrigerant from another stage of refrigeration. Similarly, the refrigerant produced by the refrigeration process 118 may be used to cool and liquefy refrigerant of a lower temperature cascade process. Further, FIG. 1 shows a single compressor. It is recognized that this same compression effect can be obtained using two compressors in parallel, or that the compression process may be broken up into stages via compressors in series or a two stage compressor. All of these possible variations are considered to be within the scope of this disclosure.

Further, the FIGS. 1 through 8 associate with only one evaporator coil 136. In principle this approach can be applied to multiple evaporator coils 136 cooled by a single refrigeration process 118. In such a construction, each independently controlled evaporator coil 136 requires a separate set of valves and FMD's to control the feed of refrigerants (i.e. defrost valve 180, FMD 184, defrost valve 178, FMD 182, FMD 126, cool valve 130, FMD 124, and cool valve 128) and the valves required to control the bypass (i.e., check valve 146 and bypass valve 188). Feed valve 176 and service valve 190 are standard diaphragm valves or proportional valves, such as Superior Packless Valves (Washington, Pa.), that provide some service functionality to isolate components if needed.

Expansion tank 192 a conventional reservoir in a refrigeration system that accommodates increased refrigerant volume caused by evaporation and expansion of refrigerant gas due to heating. In this case, when refrigeration system 100 is off, refrigerant vapor enters expansion tank 192 through FMD 194.

Cool valve 128, cool valve 130, defrost valve 178, defrost valve 180, and bypass valve 188, are standard solenoid valves, such as Sporlan (Washington, Mo.) models xuj, B-6 and B-19 valves. Alternatively, cool valves 128 and 130 are proportional valves with closed loop feedback, or thermal expansion valves.

Check valve 146 is a conventional check valves that allows flow in only one direction. Check valve 146 opens and closes in response to the refrigerant pressures being exerted on it. (Additional description of check valve 146 follows.) Since this valve is exposed to very low temperature it must be made of materials compatible with these temperatures. In addition, the valve must have the proper pressure rating. Further, it is preferred that the valve have no seals that would permit leaks of refrigerant to the environment. Therefore it should connect via brazing or welding. An example check valve is a series UNSW check valve from Check-All Valve (West Des Moines, Iowa).

FMD 124, FMD 126, FMD 182, FMD 184, and FMD 196 are conventional flow metering devices, such as a capillary tube, an orifice, a proportional valve with feedback, or any restrictive element that controls flow.

Feed valve 122, cryo-isolation valves 132 and 140, and return valve 144 are typically standard diaphragm valves, such as manufactured by Superior Valve Co. However, standard diaphragm valves are difficult to operate at very low temperature temperatures because small amounts of ice can build up in the threads, thereby preventing operation. Alternatively, Polycold (San Rafael, Calif.) has developed an improved very low temperature shutoff valve to be used for cryo-isolation valves 132 and 140 in very low temperature refrigeration system 100. The alternate embodiment of cryo-isolation valves 132 and 140 is described as follows. Cryo-isolation valves 132 and 140 have extension shafts incased in sealed stainless steel tubes that are nitrogen or air filled. A compression fitting and O-ring arrangement at the warm end of the shafts provides a seal as the shafts are turned. As a result, the shafts of cryo-isolation valves 132 and 140 can be turned even at very low temperature temperatures. This shaft arrangement provides thermal isolation, thereby preventing frost buildup.

The evaporator surface to be heated or cooled is represented by evaporator coil 136. Examples of customer installed evaporator coil 136 are a coil of metal tubing or a platen of some sort, such as a stainless steel table that has a tube thermally bonded to it or a table which has refrigerant flow channels machined into it. The evaporator is not a novel portion of the invention. Thus it is not significant to the claims whether the evaporator is "customer installed" or provided otherwise.

FIG. 2 illustrates an exemplary refrigeration process 118. For the purposes of illustration in this disclosure, refrigeration process 118 is shown in FIG. 2 as an auto-refrigerating cascade cycle. However, refrigeration process 118 of very low temperature refrigeration system 100 is any refrigeration system or process, such as a single-refrigerant system, a mixed-refrigerant system, normal refrigeration processes, an individual stage of a cascade refrigeration processes, an auto-refrigerating cascade cycle, a Klimenko cycle, etc.

More specifically, refrigeration process 118 may be the Polycold system (i.e., autorefrigerating cascade process), APD Cryogenics (Allentown, Pa.) system with single expansion device (i.e., single stage cryocooler having no phase separation, Longsworth U.S. Pat. No. 5,441,658), Missimer type cycle (i.e., autorefrigerating cascade, Missimer U.S. Pat. No. 3,768,273), Kilmenko type (i.e., single phase separator system. Also refrigeration process 118 may be variations on these processes such as described in Forrest U.S. Pat. No. 4,597,267 and Missimer U.S. Pat. No. 4,535,597.

Essential to the invention is that the refrigeration process used must contain at least one means of flowing refrigerant through the refrigeration process during the defrost mode. In the case of a single expansion device cooler, or a single refrigerant system, a valve (not shown) and FMD (not shown) are required to allow refrigerant to flow through the refrigeration process from the high pressure side to the low pressure side. This assures that refrigerant flows through the condenser 112 so that heat may be rejection from the system. This also assures that during defrost low pressure refrigerant from refrigeration process 118 will be present to mix with the returning defrost refrigerant from line 186. In the stabilized cool mode the internal flow from high side to low side can be stopped by closing this valve for those refrigeration processes that do not require such an internal refrigeration flow path to achieve the desired refrigeration effect (systems that traditional have a single FMD).

Refrigeration process 118 of FIG. 2 includes a heat exchanger 202, a phase separator 204, a heat exchanger 206, and a heat exchanger 208. In the supply flow path, refrigerant flowing in liquid line 116 feeds heat exchanger 202, which feeds phase separator 204, which feeds heat exchanger 206, which feeds heat exchanger 208, which feeds refrigerant supply line 120. In the return flow path, refrigerant return line 148 feeds heat exchanger 208, which feeds heat exchanger 206. The liquid fraction removed by the phase separator is expanded to low pressure by an FMD 210. Refrigerant flows from FMD 210 and then is blended with the low pressure refrigerant flowing from heat exchanger 208 to heat exchanger 206. This mixed flow feeds heat exchanger 206 which in turn feeds heat exchanger 202 which subsequently feeds compressor suction line 164. The heat exchangers exchange heat between the high pressure refrigerant and the low pressure refrigerant.

In more elaborate auto refrigerating cascade systems additional stages of separation may be employed in refrigeration process 118, as described by Missimer and Forrest.

Heat exchangers 202, 206, and 208 are devices that are well known in the industry for transferring the heat of one substance to another. Phase separator 204 is a device that is well known in the industry for separating the refrigerant liquid and vapor phases. FIG. 2 shows one phase separator; however, typically there is more than one.

With continuing reference to FIGS. 1 and 2, the operation of very low temperature refrigeration system 100 is as follows:

The hot, high-pressure gas from compressor 104 travels through optional oil separator 108 and then through condenser 112 where it is cooled by air or water passing through or over it. When the gas reaches the end of condenser 112, it has condensed partially and is a mixture of liquid and vapor refrigerant.

The liquid and vapor refrigerant from condenser 112 flows through filter drier 114, and then feeds refrigeration process 118. Refrigeration process 118 of very low temperature refrigeration system 100 typically has an internal refrigerant flow path from high to low pressure. Refrigeration process 118 produces very cold refrigerant (minus −100 to −150 C) at high pressure that flows to cold gas feed valve 122 via refrigerant supply line 120.

The cold refrigerant exits feed valve 122 and feeds the series combination of FMD 124 and full flow cool valve 128 arranged in parallel with the series combination of FMD 126 and restricted flow cool valve 130, where the outlets of cool valves 128 and 130 are connected together at a node D that feeds the inlet of cryo-isolation valve 132.

The customer connects evaporator coil 136 between cryo-isolation valve 132 and cryo-isolation valve 140, which act as shutoff valves. More specifically, cryo-isolation valve 132 feeds evaporator supply line 134 which connects to the evaporator surface to be heated or cooled, i.e., evaporator coil 136. The opposing end of the evaporator surface to be heated or cooled, i.e., evaporator coil 136, connects to evaporator return line 138, which feeds the inlet of cryo-isolation valve 140.

The return refrigerant from evaporator coil 136 flows through cryo-isolation valve 140 to very low temperature flow switch 152.

The return refrigerant flows from the outlet of cryogenic flow switch 152 through return valve 144, and subsequently to check valve 146. Check valve 146 is a spring-loaded cryogenic check valve with a typical required cracking pressure of between 1 and 10 psi. That is to say that the differential pressure across check valve 146 must exceed the cracking pressure to allow flow. Alternatively, check valve 146 is a cryogenic on/off valve, or a cryogenic proportional valve of sufficient size to minimize the pressure drop. The outlet of check valve 146 feeds refrigeration process 118 via refrigerant return line 148. Check valve 146 plays an essential role in the operation of refrigeration system 100 of the present invention.

It should be noted that feed valve 122 and return valve 144 are optional and somewhat redundant to cryo-isolation valve 132 and cryo-isolation valve 140, respectively. However, feed valve 122 and return valve 144 do provide some service functionality to isolate components if needed in servicing the system.

Very low temperature refrigeration system 100 is differentiated from conventional refrigeration systems primarily by its extended defrost cycle (i.e. bakeout). A specific differentiating feature of very low temperature refrigeration system 100 from conventional refrigeration systems is the presence of check valve 146 in the return path to the refrigeration process 118 and a return bypass loop from node E to F circumventing refrigeration process 118.

In the case of a conventional refrigeration system where check valve 146 is not present, the return refrigerant goes directly into refrigeration process 118 (in either cool or defrost mode). However, during a defrost cycle, it is typical that refrigeration process 118 is terminated when the return refrigerant temperature to refrigeration process 118 reaches +20 C, which is the typical temperature at the end of the defrost cycle. At that point the +20 C refrigerant is mixing with very cold refrigerant within refrigeration process 118. The mixing of room temperature and very cold refrigerant within refrigeration process 118 can only be tolerated for a short period of time before refrigeration process 118 becomes overloaded, as there is too much heat being added. Refrigeration process 118 is strained to produce very cold refrigerant while being loaded with warm return refrigerant, and the refrigerant pressure eventually exceeds its operating limits, thereby causing refrigeration process 118 to be shut down by the safety system 198 in order to protect itself. As a result the defrost cycle in a conventional refrigeration system is limited to approximately 2 to 4 minutes and to a maximum refrigerant return temperature of about +20 C.

By contrast however, very low temperature refrigeration system 100 has check valve 146 in the return path to refrigeration process 118 and a return bypass loop around refrigeration process 118, from node E to F, via bypass line 186, bypass valve 188, and service valve 190, thereby allowing a different response to the warm refrigerant returning during a defrost cycle. Like feed valve 122 and return valve 144, service valve 190 is not a requirement but provides some service functionality to isolate components if service is needed.

During a defrost cycle, when the return refrigerant temperature within refrigeration process 118 reaches, for example, −40 or warmer due to the warm refrigerant mixing with cold refrigerant, the bypass line from node E to F is opened around refrigeration process 118. As a result, the warm refrigerant is allowed to flow into compressor suction line 164 and then on to compressor 104. Bypass valve 188 and service valve 190 are opened due to the action of TS 158, TS 160, and TS 162. For example, TS 158 is acting as the "defrost plus switch" having a set point of >−25 C. TS 160 (optional) is acting as the "defrost terminating switch" having a set point of >42 C. TS 162 is acting as the "cool return limit switch" having a set point of >−80 C. In general, TS 158, TS 160, and TS 162, respond based on the temperature of the return line refrigerant and based on the operating mode (i.e. defrost or cool mode), in order to control which valves to turn on/off to control the rate of heating or cooling by refrigeration system 100. Some applications require a continuous defrost operation. In these cases TS 160 is not needed to terminate the defrost since continuous operation of this mode is required.

Essential to the operation is that the differential pressure between nodes E and F, when there is flow through bypass valve 188 and service valve 190, has to be such that the differential pressure across check valve 146 does not exceed its cracking pressure (i.e., 5 to 10 psi). This is important because, by nature, fluids take the path of least resistance; therefore, the flow must be balanced correctly. If the pressure across bypass valve 188 and service valve 190 were allowed to exceed the cracking pressure of check valve 146, then flow would start through check valve 146. This is not desirable because the warm refrigerant would start to dump back into the refrigeration process 118 at the same time that warm refrigerant is entering compressor suction line 164 and feeding compressor 104. Simultaneous flow through check valve 146 and the bypass loop from node E to F would cause refrigeration system 100 to become unstable, and would create a runaway mode in which everything gets warmer, the head pressure (compressor discharge) becomes higher, the suction pressure becomes higher, causing more flow to refrigeration process 118, and the pressure at E becomes even higher, and the eventually causing shutdown of refrigeration system 100.

This condition can be prevented if a device such as PS 196 is used to interrupt the flow of hot gas to the refrigeration process if the suction pressure exceeds a predetermined value. Since the mass flow rate of refrigeration system 100 is largely governed by the suction pressure, this becomes an effective means of limiting flow rate in a safe range. On fall of the suction pressure below a predetermined limit PS 196 will reset and again permit resumption of the defrost process.

Thus, for proper operation during a defrost cycle of refrigeration system 100, the flow balance through bypass valve 188 and service valve 190, vs. check valve 146 are controlled carefully to provide the proper balance of flow resistance. Design parameters around the flow balance issue include pipe size, valve size, and flow coefficient of each valve. In addition, the pressure drop through the refrigeration process 118 on the suction (low pressure) side may vary from process to process and needs to be determined. The pressure drop in refrigeration process 118 plus the cracking pressure of check valve 146 is the maximum pressure that the defrost return bypass line from E to F can tolerate.

Bypass valve 188 and service valve 190 are not opened immediately upon entering a defrost cycle. The time in which the bypass flow begins is determined by the set points of TS 158, TS 160, and TS 162, whereby the flow is delayed until the return refrigerant temperature reaches a more normal level, thereby allowing the use of more standard components that are typically designed for −40 C or warmer and avoiding the need for more costly components rated for temperatures colder than −40 C.

Under the control of TS 158, TS 160, and TS 162, the refrigerant temperature of the fluid returning to node F of compressor suction line 164 and mixing with the suction return gas from refrigeration process 118 is set. The refrigerant mixture subsequently flows to compressor 104. The expected return refrigerant temperature for compressor 104 is typically −40° C. or warmer; therefore, fluid at node E being −40° C. or warmer is acceptable, and within the operating limits of the compressor 104. This is another consideration when choosing the set points of TS 158, TS 160, and TS 162.

There are two limits of choosing the set points of TS 158, TS 160, and TS 162. Firstly, the defrost bypass return refrigerant temperature cannot be selected as such a high temperature that refrigeration process 118 shuts itself off because of high discharge pressure. Secondly, the defrost bypass return refrigerant temperature can not be so cold that the return refrigerant flowing though bypass line 186 is colder than can be tolerated by bypass valve 188 and service valve 190. Nor can the return refrigerant, when mixed at node F with the return of refrigeration process 118, be below the operating limit of the compressor 104. Typical crossover temperature at node E is between −40 and +20° C.

To summarize, the defrost cycle return flow in the refrigeration system 100, does not allow the defrost gas to return to refrigeration process 118 continuously during the defrost cycle. Instead, refrigeration system 100 causes a return bypass (node E to F) to prevent overload of refrigeration process 118, thereby allowing the defrost cycle to operate continuously. TS 158, TS 160, and TS 162, control when to open the defrost return bypass from nodes E to F. In cool mode the defrost return bypass from nodes E to F is not allowed once very low temperatures are achieved.

Having discussed the defrost cycle return path of refrigeration system 100, a discussion of the defrost cycle supply path follows, with continuing reference to FIG. 1. During the defrost cycle, the hot, high-pressure gas flow from compressor 104 is via node A of discharge line 110 located downstream of the optional oil separator 108. The hot gas temperature at node A is typically between 80 and 130° C.

The hot gas for defrost bypasses refrigeration process 118 at node A and does not enter condenser 112, as the flow is diverted by opening solenoid defrost valve 178 or solenoid defrost valve 180 and having valves 128 and 130 in a closed condition. As described in FIG. 1, defrost valve 178 is arranged in series with FMD 182; likewise, defrost valve 180 is arranged in series with FMD 184. The series combination of defrost valve 178 and FMD 182 is arranged in parallel between nodes B and C with the series combination of defrost valve 180. and FMD 184. Defrost valve 178 or defrost valve 180 and its associated FMD may be operated in parallel or separately depending on the flow requirements.

It will be apparent to those skilled in the art that when the bypass from nodes A to D is open, the bypass gas flow should not carry the entire compressor heat to the evaporator coil 136. Therefore, it is necessary that some of the compressor discharge gas at high temperature that reaches node A, must pass through the condenser 112. A portion of the compressor discharge is cooled in the condenser and returns to the compressor by way of an internal throttle unit located within the refrigeration process 118. The internal throttle unit, not shown for the sake of clarity in the drawing, allows the condenser to dissipate heat from the compressor 104. Otherwise, the system will quickly overheat because work continues to be done to the system by the compressor.

It is important to note that the number of parallel paths, each having a defrost valve in series with an FMD, between nodes B and C of refrigeration system 100 is not limited to two, as shown in FIG. 1. Several flow paths may be present between nodes B and C, where the desired flow rate is determined by selecting parallel path combinations. For example, there could be a 10% flow path, a 20% flow path, a 30% flow path, etc. The flow from node C is then directed to node D and subsequently through cryo-isolation valve 132 and to the customer's evaporator coil 136 for any desired length of time provided that the return bypass loop, node E to node F, through bypass valve 188 is present. The defrost supply loop from node A to node D is a standard defrost loop used in conventional refrigeration systems. However, the addition of defrost valve 178, defrost valve 180, and their associated FMDs is a unique feature of refrigeration system 100 that allows controlled flow. Alternatively, defrost valves 178 and 180 are themselves sufficient metering devices, thereby eliminating the requirement for further flow control devices, i.e., FMD 182 and FMD 184.

Having discussed the defrost cycle of refrigeration system 100, a discussion of the use of the defrost return bypass loop during the cool cycle follows, with continuing reference to FIG. 1. In the cool mode, bypass valve 188 is typically closed; therefore, the hot refrigerant flows from nodes E to F through refrigeration process 118. However, monitoring the refrigerant temperature on refrigerant return line 142 can be used to cause bypass valve 188 to open in the initial stage of cool mode when the refrigerant temperature at node E is high but falling. Enabling the defrost return bypass loop assists in avoiding further loads to refrigeration process 118 during this time. When refrigerant temperature at node E reaches the crossover temperature, previously discussed (i.e., −40 or warmer), bypass valve 188 is closed. Bypass valve 188 is opened using different set points for cool mode vs. bakeout.

Also pertaining to the cool cycle, cool valves 128 and 130 may be opened and closed in a pulsed fashion using a "chopper" circuit (not shown) having a typical period about 1 minute. This is useful to limit the rate of change during cool down mode. Cool valve 128 and cool valve 130 have different sized FMDs. Thus the flow is regulated in an open loop fashion, as the path restriction is different through cool valve 128 than through cool valve 130. The path is then selected as needed. Alternatively, one flow path may be completely open, the other pulsed, etc.

Embodiments 2 through 6 that follow in description indicate variations in accordance with the invention of refrigeration system 100 pertaining to the defrost bypass return function.

In a second embodiment (not shown), an additional heater or heat exchanger is placed (FIG. 1) in bypass line 186 between node E and bypass valve 188. This additional heater or heat exchanger provides further refrigerant temperature control such that the refrigerant temperature in bypass line 186 is prevented from being colder than the operating limits of bypass valve 188 and/or service valve 190. The heat exchanger could exchange heat with any other process flow, including cooling water. In the case of cooling water, it must be controlled such that the water does not freeze.

In a third embodiment (not shown), instead of using standard 2 position (open/closed) valves or proportional valves (FIG. 1) for bypass valve 188 and service valve 190, valves that are rated for cryogenic temperatures are used for bypass valve 188 and service valve 190. An example of a cryogenic valve is a Badgemeter Research valve. Such a proportional valve operates in an open and close fashion. Alternatively it operates in a proportional manner when controlled by a proportional controller.

In a fourth embodiment (not shown), cryogenic bypass valve 188 (FIG. 1) and cryogenic service valve 190 as described in the third embodiment are used in series with a conventional flow metering device, such as a capillary tube, an orifice, a proportional valve with feedback, or any restrictive element that controls flow. The flow rate is metered very slowly at either FMD 184 or FMD 182 so the flow through the defrost return bypass loop is such that the resulting mixture at node F is within the limits of compressor 104. The refrigerant flow from the defrost return bypass loop would be so minimal that it would have little effect on dropping the temperature at node F.

In a fifth embodiment (not shown), cryogenic bypass valve 188 (FIG. 1) and cryogenic service valve 190 as described in the third embodiment are used. Additionally, a heater or heat exchanger is placed in line in compressor suction line 164 between node F and service valve 102 for the purpose of warming up the return refrigerant.

Figure 3:
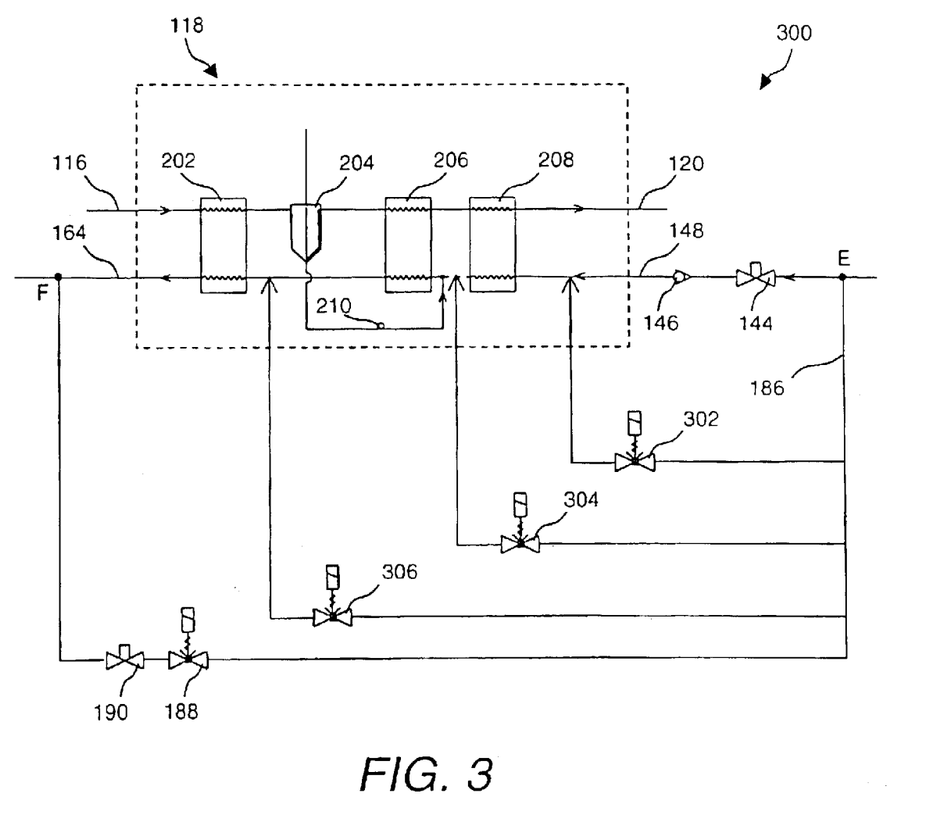
FIG. 3 is a partial schematic diagram of a defrost bypass loop in accordance with the invention for use in the refrigeration system of FIG. 1.

FIG. 3 illustrates a sixth embodiment in accordance with the invention of the defrost return bypass loop of refrigeration system 300. In this embodiment, an array of return valves are present such that the defrost refrigerant flow is returned to one of several potential places in refrigeration process 118.

As an example, refrigeration system 300 of FIG. 3 includes a bypass valve 302, a bypass valve 304, and a bypass valve 306, the inlets of which are hydraulically connected to bypass line 186 connecting to node E along with bypass valve 188. The outlets of bypass valves 302, 304, and 306 are connected back into different points within refrigeration process 118 based on the return refrigerant temperature. Although they are not shown in FIG. 3, service valves may be inserted in line with bypass valves 302, 304, and 306. Those portions of the system not shown in FIG. 3 are similar to FIG. 1.

This arrangement of bypass valves 302, 304, and 306 allows return gas to be injected back into refrigeration process 118 at an appropriate temperature that can be handled by refrigeration process 118. The temperatures in operation of refrigeration process 118 span a complete temperature spectrum, typically −150 C to room temperature. The flow is returned to one of several potential places within refrigeration process 118 that match the temperature of the bypass refrigerant flow. Thus, bypass valves 302, 304, and 306, or bypass valve 188 are opened selectively depending on the bypass refrigerant temperature. As a result, the return refrigerant temperature at node F of compressor suction line 164 is maintained in the proper operating range of compressor 104.

This sixth embodiment is preferred over the fifth embodiment, as it makes use of existing heat exchangers. This embodiment of refrigeration system 300 does not need the additional heater or heat exchanger of the fifth embodiment.

This arrangement of valves can also be used during the cool down process alter the completion of defrost. By delivering the returning refrigerant to a part of refrigeration process 118 that is similar in temperature, the heat load on refrigeration system 100 is reduced. This permits a more rapid cool down of evaporator coil 136 than in FIG. 1 without valves 302, 304 and 306.

Embodiments 7 through 14 that follow indicate variations of refrigeration system 100 pertaining to the normal defrost supply function.

Figure 4:
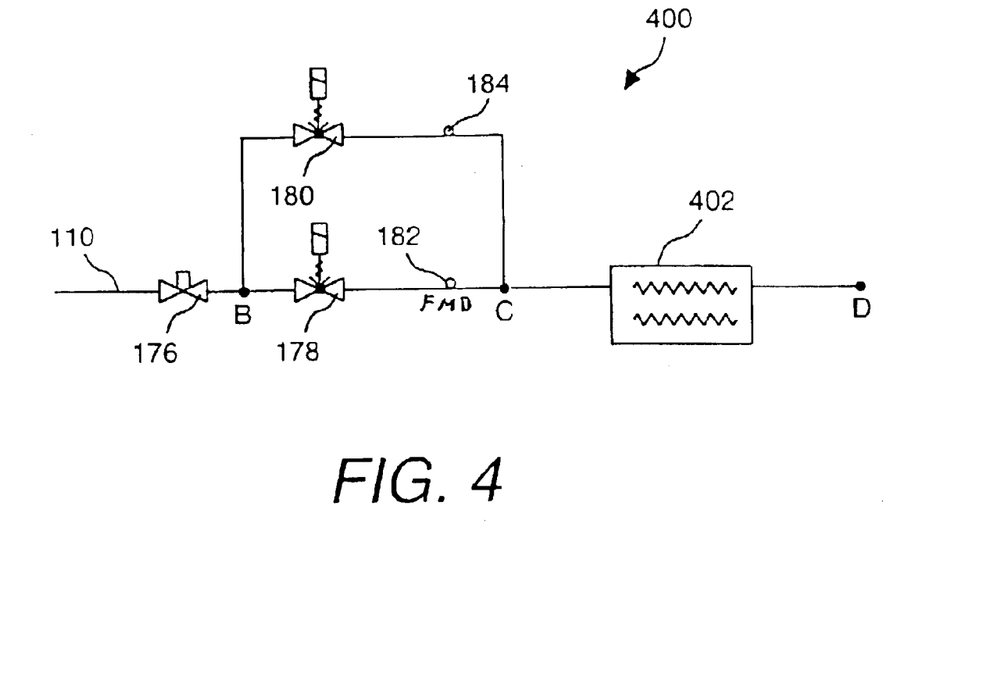
FIG. 4 is a partial schematic diagram of a defrost supply loop in accordance with the invention for use in the refrigeration system of FIG. 1.

FIG. 4 (seventh embodiment) illustrates a variation of the defrost supply loop of refrigeration system 100. In this embodiment, refrigeration system 400 of FIG. 4 includes an additional heat exchanger 402, which is inserted in line between nodes C and D. Heat exchanger 402 is a conventional heat exchanger or heater.

In some applications, there is a need for the refrigerant feeding customer-installed evaporator coil 136 to be at a specific minimum elevated temperature. However, defrost valve 178, defrost valve 180, and their associated FMDs 182 and 184 cause the refrigerant temperature to drop, due to expanding gas. As a result, the temperature of the refrigerant feeding evaporator coil 136 drops, typically by about 10° C. To compensate, heat exchanger 402 is inserted between nodes C and D to reheat gas. If heat exchanger 402 has no controls: it simply exchanges heat between discharge line 110 of compressor 104 and the gas from FMD 182 or FMD 184 to warm the defrost gas. If heat exchanger 402 is a heater: controls are used to regulate the temperature exiting the heater.

Figure 5:
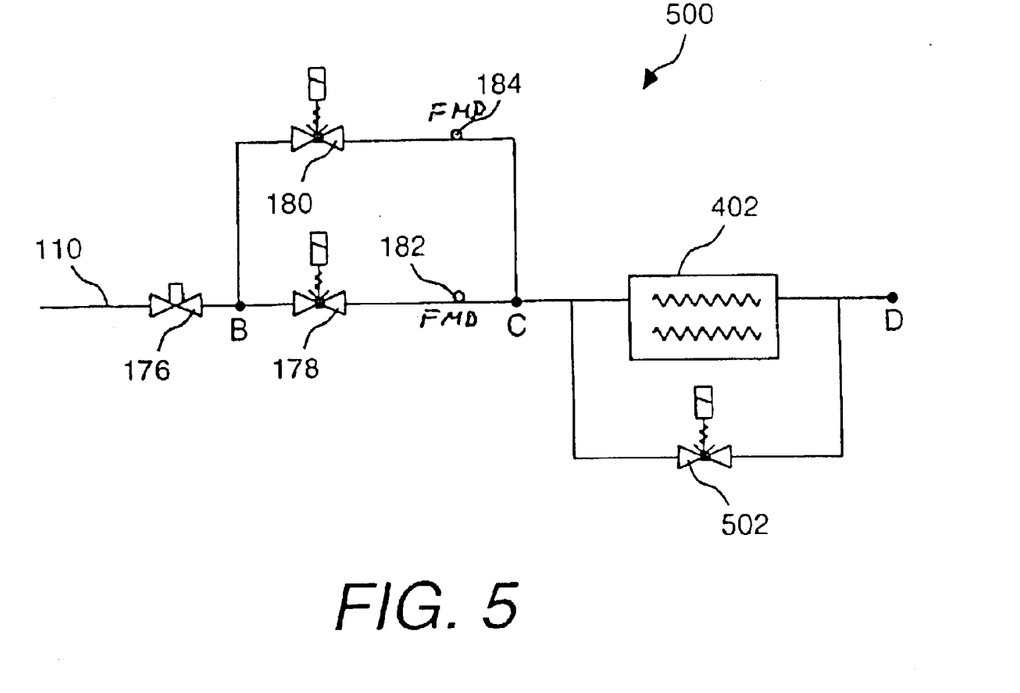
FIG. 5 is a partial schematic diagram of another defrost supply loop in accordance with the invention for use in the refrigeration system of FIG. 1.

FIG. 5 (eighth embodiment) illustrates another variation of the defrost supply loop of refrigeration system 100. In this embodiment, refrigeration system 500 of FIG. 5 includes a bypass valve 502 arranged in parallel with heat exchanger 402 of the seventh embodiment. Bypass valve 502 is typically a proportional valve.

Differing from the seventh embodiment where heat exchanger 402 has no controls to warm the gas, bypass valve 502 provides a method of regulating the amount of heat exchanged with the discharge gas of compressor 104 to achieve a desired refrigerant temperature. The refrigerant is allowed to bypass heat exchanger 402 via bypass valve 502 with controlled flow, thereby allowing the refrigerant temperature to be regulated. Alternatively, bypass valve 502 could be a "chopper" valve that pulses on or off for different lengths of time.

Figure 6:
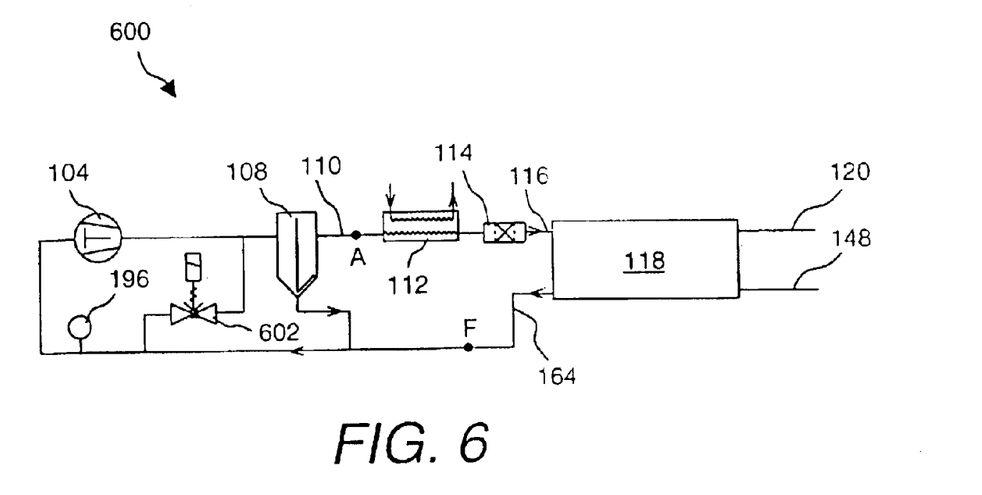
FIG. 6 is a partial schematic diagram of compressor side of a refrigeration system in accordance with the invention with a variable shunt valve.

FIG. 6 illustrates another variation 600 (ninth embodiment) of refrigeration system 100, in which a variable shunt valve 602 is inserted between discharge line 110 of compressor 104 and compressor suction line 164.

In this embodiment, the compressor suction temperature is regulated as a way to control the discharge temperature. Variable shunt valve 602 allows discharge flow to be diverted directly back into compressor suction line 164 feeding compressor 104. A temperature sensor (not shown) from FMD 182 or FMD 184 in the defrost supply loop provide feedback to variable shunt valve 602 to control its flow rate.

When this embodiment is used in combination with embodiment 7 or 8, then the temperature to be controlled may be the discharge temperature itself, because heat exchanger 402 of embodiment 7 and 8 is exchanging heat with the discharge gas having a typical temperature between +80 and +130° C. Thus the refrigerant temperature exiting the defrost supply loop at node D and subsequently flowing to evaporator coil 136 could be as high as +80 to +130° C.

Figure 7:
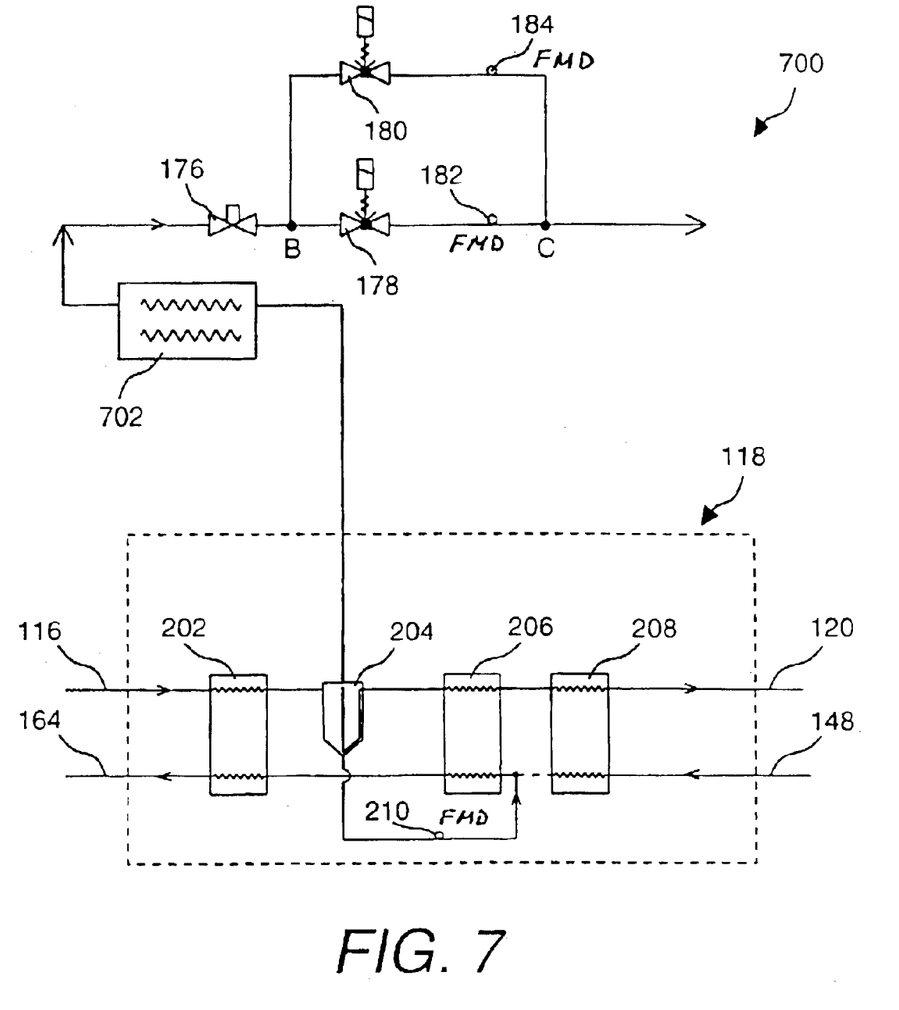
FIG. 7 is a partial schematic diagram of the high pressure side of a refrigeration system in accordance with the invention as in of FIG. 1 with a heat exchanger.

FIG. 7 illustrates another variation (tenth embodiment) of refrigeration system 100. In this embodiment, instead of discharge gas from compressor 104, a different composition of refrigerant mix directly from refrigeration process 118 is fed to the defrost supply loop.

As an example, refrigeration system 700 of FIG. 7 includes a heat exchanger 702 fed from phase separator 204 of refrigeration process 118. The inlet of feed valve 176 is no longer connected to node A of discharge line 110. Instead, the outlet of heat exchanger 702 feeds the inlet of feed valve 176, thereby providing a different composition of preheated refrigerant mix directly from refrigeration process 118 to the defrost supply loop.

Heat exchanger 702 has no controls: it simply exchanges heat between discharge line 110 of compressor 104 and the refrigerant from refrigeration process 118 to warm it.

This tenth embodiment is preferred over embodiments 7, 8, and 9, in which the refrigerant mixture has improved thermodynamic properties that are better suited for customer-installed evaporator coil 136. Such improved thermodynamic properties include a lower concentration of refrigerants that might freeze or refrigerants having a lower concentration of oil.

In summary, the typical source of heated gas feeding feed valve 122 is discharge line 110 of compressor 104. However, feed valve 122 could potentially be fed from any refrigerant composition within the system that is at high pressure and is then heated via heat exchanger 702 exchanging heat with discharge line 110 of compressor 104 to bring refrigerant temperature up to the required temperature.

In an eleventh embodiment 700, heat exchanger 702 of the tenth embodiment is fed by one source within refrigeration process 118 as shown in FIG. 7. However, heat exchanger 702 exchanges heat with different locations within refrigeration system 700 using a controller to control temperature sensors and valves, thereby selecting any location with which to exchange heat.

Figure 8:
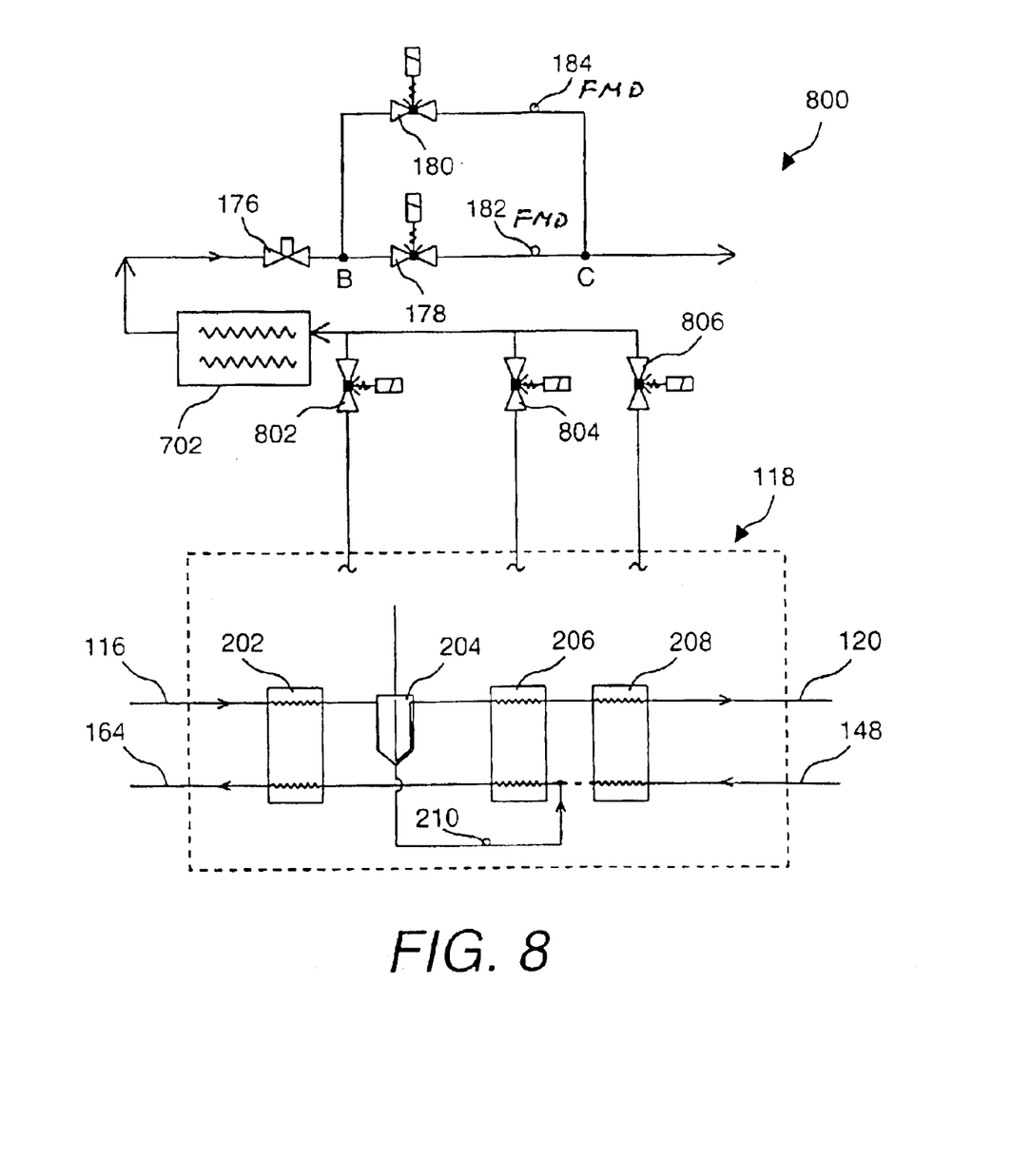
FIG. 8 is a partial schematic diagram of another embodiment of the high pressure side of the refrigeration system of FIG. 1 in accordance with the invention.

FIG. 8 illustrates another variation 800 (twelfth embodiment) of refrigeration system 100. In this embodiment, instead of discharge gas from compressor 104, a different composition of refrigerant mix directly from one of several potential places within refrigeration process 118 is fed to the defrost supply loop.

As an example, refrigeration system 800 of FIG. 8 includes heat exchanger 702 fed from one of several potential places within refrigeration process 118. The inlet of feed valve 176 is no longer connected to node A of discharge line 110. Instead, the outlet of heat exchanger 702 feeds the inlet of feed valve 176, thereby providing a different composition of preheated refrigerant mix directly from refrigeration process 118 to the defrost supply loop.

Differing from the eleventh embodiment where heat exchanger 702 has a single source, heat exchanger 702 is fed by a plurality of sources. Refrigeration system 800 of FIG. 8 includes a valve 802, a valve 804, and a valve 806, the inlets of which are hydraulically connected to one of several taps within refrigeration process 118.

In some applications, there is a need for the refrigerant that feed the customer-installed evaporator coil 136 to vary over time, instead of being supplied at a constant temperature.

Since the temperatures in refrigeration process 118 span a complete temperature spectrum, typically −150° C. to room temperature (15 C. to 30 C.), the arrangement of valves 802, 804, and 806 allows refrigerant to be to drawn from several taps in high pressure side of the refrigeration process 118 at an appropriate temperature required at customer-installed evaporator coil 136 at any given time. A controller is used to control temperature sensors and valves, thereby selecting the source feed and temperature to heat exchanger 702. The feed to heat exchanger 702 can be shifted from one place to another at different times in the defrost cycle. For example, the feed to heat exchanger 702 could start at a cold point and proceed to warmer and warmer temperatures during the defrost cycle.

In some cases heat exchanger 702 will not be needed. As evaporator coil 136 is warmed, progressively warmer flows are selected from valves 806, 804 and 802. In addition, defrost valve 180 or defrost valve 182 could be used to provide a flow of hot refrigerant.

In a thirteenth embodiment, the principles and elements of embodiments 11 and 12 are combined and used in variations of refrigeration systems 700 and 800.

In some applications, there is a need for the refrigerant that feeds the customer-installed evaporator coil 136 to be a specific temperature. However, defrost valve 178, defrost valve 180, and their associated FMDs 182 and 184 cause the refrigerant temperature to drop, due to expanding gas. As a result, the temperature of the refrigerant feeding evaporator coil 136 drops, typically by about 10° C. To compensate, in a fourteenth embodiment, defrost valve 178 and defrost valve 180 could be pulsed using a "chopper" circuit to regulate the flow to customer installed evaporator coil 136 and limit the rate of change of the warm up. Typical cycle time for these valves range from several seconds to a few minutes.

Alternatively, defrost valves 178 and 180 could be replaced with proportional valves controlled such that the rate of change of the warm up is regulated.

In a fifteenth embodiment, in keeping with the invention, one or both of defrost valves 178 and defrost valve 180 are pulsed on and off using a chopping circuit to regulate the time averaged flow to customer installed evaporator coil 136 and limit the rate of the warm up. In this embodiment an alternative arrangement of system components are used. Specifically, return bypass line consisting of items 186, 188 and 190 is eliminated and the returning defrost gas is received the return path of refrigeration process 118 through line 148 after passing through optional components 144, 146, 152, and 140. Further, the use of both defrost valve 178 and 180 is optional and may be replaced by a single valve. Further, the use of two cool valves 130 and 128 is not critical to the defrost process and may be replaced by a single cool valve. In this embodiment, the chopper circuit using a timing device, or other control device to alternatively open and close the valve repeatedly. These time intervals may be fixed (as in the case of a timer relay) or variable (as in the case of a feed back controller), and in general will be adjusted to achieve the desired rate of warming. Due to the use of the chopper circuit, FMD's 182 and 184 are optional. This embodiment is more limited in use in that it cannot be used to provide extended heating of the cryosurface. However, it is useful in applications using a simple tube element for the cryosurface that need a reduced defrost rate and that do not require defrost temperatures above 30 C, or extended defrost/bakeout.

The time interval that such a defrost method can be applied can be considered as short term. Short term means any time interval from a few seconds to a few hours. By contrast long term operation refers to the possibility to operate continuously although in practicality the long term capability will be used for various time intervals covering a wide span from a few seconds to continuous operation.

In a sixteenth embodiment, in accordance with the invention, defrost valve 178 and defrost valve 180 are replaced by a single valve. The flow rate through this valve is controlled by FMD, or alternatively the valve is a proportional valve. Restriction of this flow rate whether by FMD or proportional valve has the effect to limit the rate of warm up. In this embodiment an alternative arrangement of system components are used. Specifically, return bypass line consisting of items 186, 188 and 190 is eliminated and the returning defrost gas is received the return path of refrigeration process 118 through line 148 after passing through optional components 144, 146, 152, and 140. Further, the use of both defrost valve 178 and 180 is optional and may be replaced by a single valve. Further, the use of two cool valves 130 and 128 is not critical to the defrost process and may be replaced by a single cool valve. In this embodiment, the chopper circuit using a timing device, or other control device to alternatively open and close the valve repeatedly. These time intervals may be fixed (as in the case of a timer relay) or variable (as in the case of a feed back controller), and in general will be adjusted to achieve the desired rate of warming. This embodiment is more limited in use in that it cannot be used to provide extended heating of the cryosurface. However, it is useful in applications using a simple tube element for the cryosurface that need a reduced defrost rate and that do not require defrost temperatures above 30 C, or extended defrost/bakeout.

What is claimed is:

1. In a refrigeration system for long term continuous operation in cooling modes and short term operation in defrost mode and for use with an evaporation unit having an inlet and an outlet for selectively cooling or heating a load comprising:

a compression unit having an inlet and an outlet, and taking in refrigerant at said inlet at a low pressure and discharging high pressure refrigerant at said outlet;

a refrigeration process unit having a high pressure circuit and low pressure circuit, said high pressure circuit receiving said high pressure refrigerant from said compression unit, said low pressure circuit delivering said low pressure refrigerant to said low pressure circuit of said compression unit, heat exchange occurring between the refrigerant in said high and low pressure circuits;

a primary throttle unit having an inlet and an outlet, said primary throttle unit inlet receiving high pressure refrigerant from said high pressure circuit of said refrigeration process unit and discharging low pressure refrigerant at said primary throttle unit outlet;

a condenser unit upstream of said primary throttle unit and said refrigeration process unit, said condenser unit removing heat from said refrigerant at said high pressure from said compressor unit and rejecting said heat externally of said refrigeration system;

a first bypass circuit including at least one high pressure branch circuit for circumventing refrigerant flow around said refrigeration process unit high pressure circuit;

a control system for directing, in selected sequences, said refrigerant in selected closed cycles between said compression unit and said evaporation unit, the improvement where the control system controls the rate of defrost of the evaporator.

2. In a refrigeration system for long term continuous operation in cooling modes and short term operation in defrost mode and for use with an evaporation unit having an inlet and an outlet for selectively cooling or heating a load comprising:

a compression unit having an inlet and an outlet, and taking in refrigerant at said inlet at a low pressure and discharging high pressure refrigerant at said outlet;

a refrigeration process unit having a high pressure circuit and low pressure circuit, said high pressure circuit receiving said high pressure refrigerant from said compression unit, said low pressure circuit delivering said low pressure refrigerant to said low pressure circuit of said compression unit, heat exchange occurring between the refrigerant in said high and low pressure circuits;

a primary throttle unit having an inlet and an outlet, said primary throttle unit inlet receiving high pressure refrigerant from said high pressure circuit of said refrigeration process unit and discharging low pressure refrigerant at said primary throttle unit outlet;

a condenser unit upstream of said primary throttle unit and said refrigeration process unit, said condenser unit removing heat from said refrigerant at said high pressure from said compressor unit and rejecting said heat externally of said refrigeration system;

a first bypass circuit including at least one high pressure branch circuit for circumventing refrigerant flow around said refrigeration process unit high pressure circuit;

a control system for directing, in selected sequences, said refrigerant in selected closed cycles between said compression unit and said evaporation unit, the improvement where the control system controls the flow of refrigerant by a proportional valve.

3. In a refrigeration system for long term continuous operation in cooling modes and short term operation in defrost mode and for use with an evaporation unit having an inlet and an outlet for selectively cooling or heating a load comprising:

a compression unit having an inlet and an outlet, and taking in refrigerant at said inlet at a low pressure and discharging high pressure refrigerant at said outlet;

a refrigeration process unit having a high pressure circuit and low pressure circuit, said high pressure circuit receiving said high pressure refrigerant from said compression unit, said low pressure circuit delivering said low pressure refrigerant to said low pressure circuit of said compression unit, heat exchange occurring between the refrigerant in said high and low pressure circuits;

a primary throttle unit having an inlet and an outlet, said primary throttle unit inlet receiving high pressure refrigerant from said high pressure circuit of said refrigeration process unit and discharging low pressure refrigerant at said primary throttle unit outlet;

a condenser unit upstream of said primary throttle unit and said refrigeration process unit, said condenser unit removing heat from said refrigerant at said high pressure from said compressor unit and rejecting said heat externally of said refrigeration system;

a first bypass circuit including at least one high pressure branch circuit for circumventing refrigerant flow around said refrigeration process unit high pressure circuit;

a control system for directing, in selected sequences, said refrigerant in selected closed cycles between said compression unit and said evaporation unit, the improvement where there is at least one high pressure branch circuit in the first bypass refrigeration circuit.

* * * * *